Figure 1:
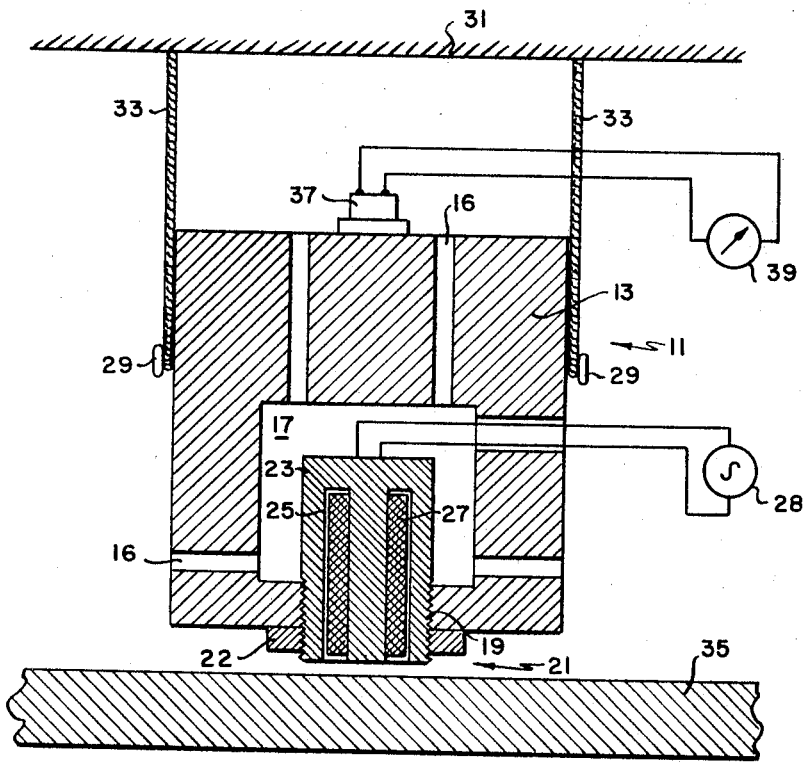

May 23, 1967  R. A. DARBY  3,320,796

VIBRATION GENERATION AND MEASUREMENT

Filed Oct. 29, 1963  2 Sheets-Sheet 1

INVENTOR.
RONALD A. DARBY
BY
ATTY.
AGENT

United States Patent Office 3,320,796
Patented May 23, 1967

3,320,796
VIBRATION GENERATION AND MEASUREMENT
Ronald A. Darby, Bay Ridge, Md., assignor to the United States of America as represented by the Secretary of the Navy
Filed Oct. 29, 1963, Ser. No. 319,895
6 Claims. (Cl. 73—67.1)

The invention described herein may be manufactured and used by or for the Government of the United States of America for governmental purposes without the payment of any royalties thereon or therefor.

The present invention relates to vibration producing apparatus, and more particularly, relates to apparatus for testing fatigue in specimens by vibrating the specimens.

One of the difficulties encountered in vibration testing is the accurate determination of the input vibratory acceleration forces without imposing any mechanical restraints on the specimen. There are many instances in the experimental vibration analysis of machines and structures where it is desirable to excite the specimens with a known dynamic force, i.e., in mechanical impedance measurements and acoustic radiation studies.

In typical prior art arrangements an electromagnetic exciter and piezoelectric force gage are employed to perform such measurements and studies. The electromagnetic exciter usually consists of a large permanent magnet which is attached to an electrical coil assembly by a suspension system capable of supporting the static weight of the magnet. The coil assembly is rigidly attached to one side of the piezoelectric force gage, and the whole assembly is rigidly bolted to the specimen. An alternating current thru the coil sets up an oscillating force field which causes the permanent magnet to act as a reaction mass exerting the force thru the force gage to the specimen.

However, in such prior art arrangements the physical size of the force gage causes anomalies to occur which are not easily or readily detectable. For example, the force gage acts as an additional mass load on the specimen and causes large shifts in the natural resonant frequencies of the specimen. The force gage also locally stiffens the specimen causing errors in natural resonances and in mode shapes. Further, the pyhsical dimensions of the force gage also make necessary the application of force a finite distance away from the specimen of the force gage.

Also the nature of force gages, piezoelectric or otherwise, are such that though they can be accurately calibrated under controlled conditions, i.e., unidirectional dynamic loading through the axis of the gage causing a simple stress field to exist in the sensing element (i.e., a compressional stress field), these idealized conditions rarely exist in measuring the vibrational characteristics of real specimens. Asymmetries and inhomogeneities of the specimen cause a complex stress field to exist in the sensing element and the electrical signal from the gage is in reality a superposition of signals: not only that due to the simple stress field that existed in calibration (say compressional) but also shear and flexural stresses which cause an erroneous interpretation of the resulting signal.

Another disadvantage in prior methods is that the suspension system supporting the permanent magnet offers unascertainable mechanical constraints to the specimen when the driven portion of the specimen tends to sway or rotate according to the normal modal configuration of the specimen.

The difficulties and disadvantages of the prior art are overcome by the present invention which eliminates physical attachments to the specimen. Briefly, according to the present invention there is provided a novel vibration driving or exciting assembly wherein a resiliently suspended reaction mass is rigidly coupled to an electromagnetic drive unit. An accelerometer is attached to the reaction mass. The unit is placed sufficiently close to, but not in intimate contact with the specimen so that the specimen may be vibrated by oscillating flux enforced thereon by the unit. The reaction mass is also vibrated, and the total mass of the drive unit, accelerometer and reaction mass, as multiplied by the measured acceleration, yields an accurate value of the force applied to the specimen.

Accordingly, it is among the objects of this invention to: Provide a novel vibration testing arrangement wherein mechanical restraints on the specimen are eliminated and wherein the local stiffness or mass of the specimen is not altered; provide application of dynamic forces directly on a surface of the specimen rather than on a rigid extension of the structure; provide a novel and versatile vibration testing system wherein vibration driving units are arranged in clusters or spatial patterns as desired whereby, with proper phasing of input drive signals to each respective unit or cluster of units, oscillatory translation forces or moments may be applied to the specimen.

Figure 2:
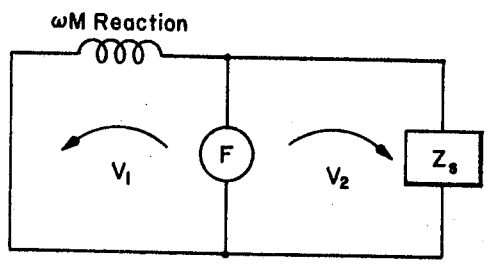
Figure 3:
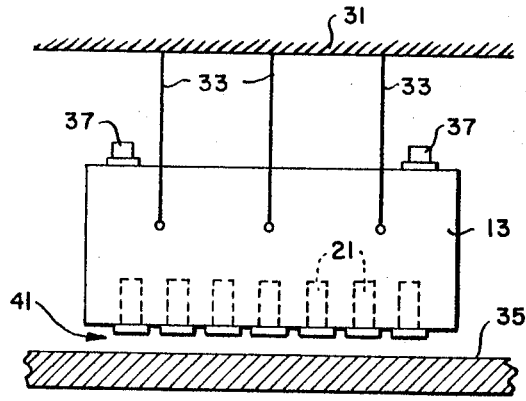
Figure 4:
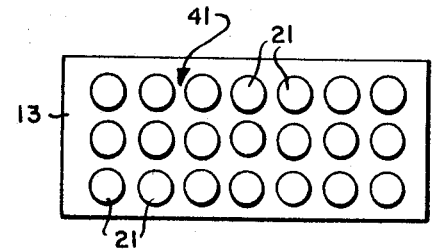
Figure 5:
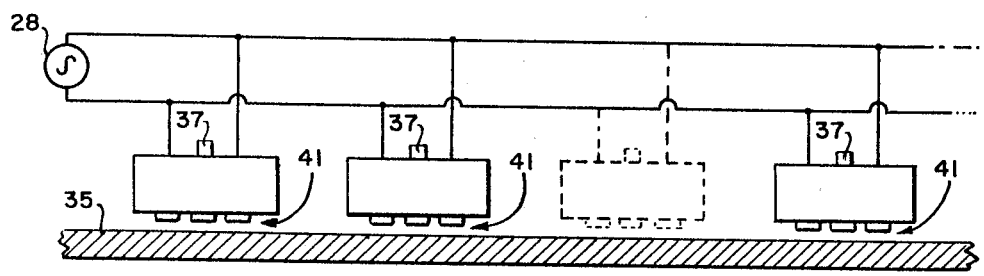
Figure 6:
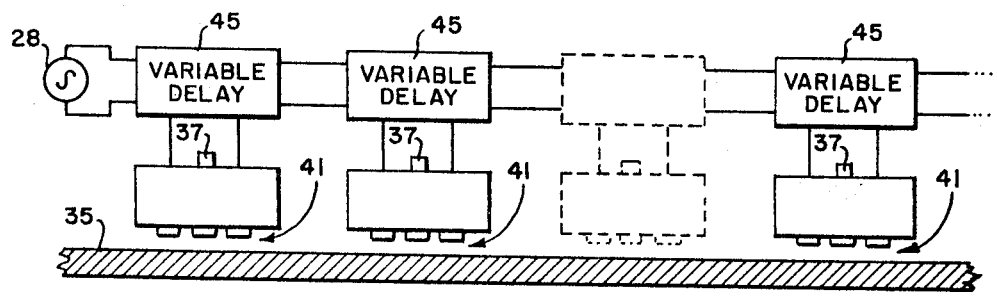

The aforementioned objects, as well as other objects, features and advantages of this invention will be better understood by reference to the accompanying drawings in which like numerals represent like parts, and in which:

FIG. 1 is a combined schematic and cross sectional view of a vibration drive assembly according to the invention;

FIG. 2 a mechanical schematic diagram illustrating certain principles of the present invention;

FIGS. 3 and 4 are illustrative views of another arrangement of the present invention; and FIGS. 5 and 6 are diagrammatic views of yet further different respective arrangements according to the invention.

Referring to FIG. 1 a vibration drive assembly 11 is composed of a reaction mass 13 in the form of a block having cooling passages 16. The block 13 has a hollow interior space 17 opening on to the bottom of the block via a threaded bore 19. An electromagnetic driver 21 is threadedly secured to the reaction mass or block 13 at the bore 19. A spacer nut or washer 22 may be provided for locating the unit 21.

The electromagnetic driver 21 has an E-shaped core 23 with a downwardly opening annular space 25. An exciting coil 27 for the E-core 23 has an A.C. supply 28 and is wound in the annular space 25. The characteristics of the E-core 23 are such that both its poles are located at the bottom end thereof.

The reaction mass or block 13 is provided with laterally extending support members 29 or any other suitable support means so that the assembly 11 may be suspendingly supported. As shown in FIG. 1, the assembly 11 is suspended from an overhead support 31 by elongated resilient elements 33. The resilient elements 33 may be of any suitable resilient material, such as natural or synthetic elastomers, e.g., nylon filament, rubber, wire-rope, hemp, and the like. The resilient elements 31 serve as means to isolate the assembly 11 from external vibrations and as means to locate the assembly 11 in close proximity to a specimen 35. The specimen 35 is composed of, or includes, material responsive to magnetic flux changes.

An accelerometer 37 of any suitable conventional construction is shown rigidly mounted at the top of the reaction mass or block 13. The accelerometer output may be displayed or read out by means of any suitable signal indicating or display device 39 electrically connected thereto.

In conjunction with the mechanical circuit diagram of FIG. 2, the operation of the arrangement of FIG. 1 will now be explained. When the coils 27 are energized, a force is applied to the specimen 35. This force is equal to the total mass of the assembly 11 multiplied by the acceleration of the assembly 11 produced by the drive unit 21. Of course, the drive unit 21 also causes the specimen 35 to vibrate due to the oscillating flux passing therethrough.

The optimum size of the reaction mass or block 13 to provide useful accelerometer readouts is a function of the magnitude of the magnetic field generated, the impedance magnitude of the specimen being driven, and the allowable minimum signals from the accelerometer. As shown in FIG. 2, where $M_r$ = the total reaction mass (i.e., the mass of assembly 11);
$V_1$ = the velocity of the reaction mass;
$F$ = the resultant force applied;
$Z_s$ = the driving point mechanical impedance of the specimen;
$V_2$ = the velocity of the specimen; and
$\omega$ = the angular velocity of the drive source;
then $$V_1 \omega M_r = V_2 Z_s = F$$

Since it is desirable that the reaction mass velocity $V_1$ be sufficiently large to enable useful accelerometer readouts, then the reaction mass $M_r$ should be kept sufficiently small in relation to the product $V_2 Z_s$ so that such useful readings are obtained. Obviously, if $M_r$ is too small, then the accelerometer sensitivity range will tend to be too small, and if the $M_r$ is too large, then the sensitivity of the accelerometer will tend to be insufficient.

Because the assembly 11 is vibratorily isolated by virtue of the resilient supports 33 and by virtue of no intimate contact with the specimen 35, the reaction of the assembly to forces produced by the electromagnetic drive unit 21 is essentially pure. The vibratory characteristics of the specimen are not deleteriously affected by the assembly 11 because there is no intimate physical contact therebetween. Consequently, the movements of the reaction mass or block 13 are an accurate reflection of the actual input acceleration forces enforced on the specimen by the drive unit 21. Thus, one or more assemblies similar to assembly 11 may be positioned at a specimen surface to obtain vibration testing data such as fatigue, etc., without interference with the normal or natural vibratory modes of the specimen itself.

Reference is now made to FIGS. 3–6 which depict in simple diagram form views of different respective arrangements according to the invention.

FIGS. 3 and 4 show one version in which a plurality of electromagnetic drive units 21 forms an array or cluster 41 thereof mounted in a reaction mass 13. The drive unit clusters 41 may be driven by a suitable A.C. source so that all portions of the array are co-phasal. Alternatively, the drive unit clusters 41 may be driven out of phase so that the specimen 35 is subjected to a traveling mechanical wave pattern which may be altered. Accelerometers 37 may be affixed to the reaction mass 13 at any suitable locations for monitoring the applied forces.

In FIG. 5 there is shown an arrangement wherein a plurality of drive unit clusters 41 is positioned adjacent to the specimen 35. The cluster plurality is shown driven in phase by an A.C. source 28.

Alternatively, as shown in FIG. 6, the specimen 35 is subjected to traveling forces. An A.C. supply source 28 is coupled to the respective drive unit clusters 41 via a plurality of delay elements 45 of any suitable design. Each delay element 45 may be controlled in any suitable manner so that the amount of delay may be varied from cluster to cluster. It is understood that by employing electromagnetic drive units 21 in clusters, a greater amount of force may be imposed on the specimen without need of fabricating larger drive units. Also, the use of the drive units in clusters allows greater scope of selectivity of application of forces and moments to a specimen.

The arrangement of the vibration assembly 11, or clusters 41, in relation to the specimens as shown in the various figures is somewhat fanciful. It is to be understood that the specimen being tested may be of practically any shape, such as building structures, machinery and machine components, vehicle structures, and the like.

In addition to the foregoing advantages, another advantage accruing to this invention is that commercially available accelerometers of conventional design may be employed, thus enhancing the procurement of accelerometers of matching characteristics. By the present invention it is made unnecessary to procure or develop matched force gage units.

Obviously, many modifications and variation of the present invention are possible in the light of the above teachings. It is therefore to be understood that within the scope of the appended claims the invention may be practiced otherwise than as specifically described.

What is claimed is:
1. Apparatus for producing vibrations in a magnetic flux-responsive specimen and for measuring said vibrations comprising:
   electromagnetic drive means;
   reaction mass means rigidly coupled to said electromagnetic drive unit means;
   resilient vibration isolation means for suspending said drive unit and reaction mass near at least one portion of the specimen thereby providing magnetic flux coupling between said drive means and the specimen; and
   accelerometer means located on said reaction mass means for providing output signals representing vibratory forces enforced on the specimen.

2. Apparatus according to claim 1 but further characterized by said electromagnetic drive means comprising a plurality of drive units and means for driving said units in variable phase relationships with respect to each other.

3. Apparatus according to claim 1 but further characterized by said reaction mass means comprising a plurality of blocks and said electromagnetic drive means comprising a cluster of electromagnetic drive units for each of said blocks and means for driving said clusters of drive units in selectively variable phase relations with respect to each other.

4. Apparatus according to claim 1 but further characterized by said electromagnetic drive means comprising a plurality of electromagnetic drive units.

5. Apparatus according to claim 4 but further characterized by said electromagnetic drive means including means for driving said drive units in the same phase.

6. Apparatus according to claim 4 but further characterized by said electromagnetic drive means including means for driving said drive units in selectively different phases.

References Cited by the Examiner

UNITED STATES PATENTS

| | | | |
|---|---|---|---|
| 2,171,303 | 8/1939 | De Forest | 73—67.4 |
| 2,803,760 | 8/1957 | Wall et al. | 73—67 XR |
| 2,890,584 | 6/1959 | Dickie | 73—71.6 |
| 3,123,728 | 3/1964 | Kreiskorte | 73—71.6 X |

FOREIGN PATENTS 824,179  11/1959  Great Britain.

RICHARD C. QUEISSER, *Primary Examiner.*

C. A. RUEHL, *Assistant Examiner.*